| United States Patent Office | 2,873,931 |
|---|---|
| | Patented Feb. 17, 1959 |

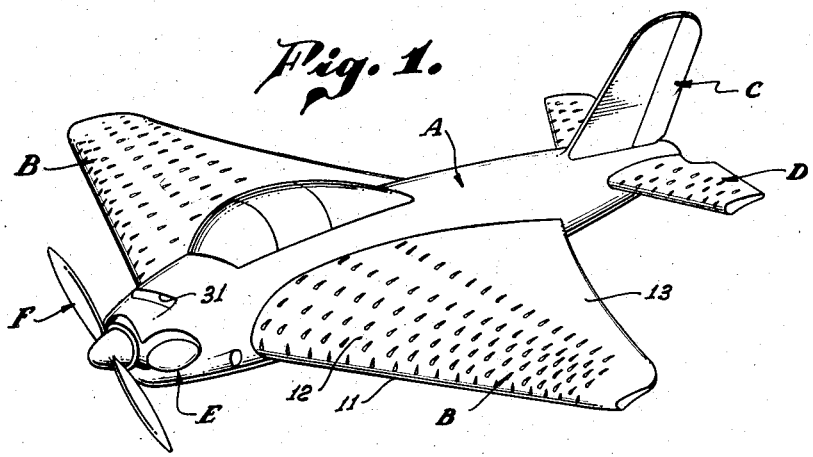
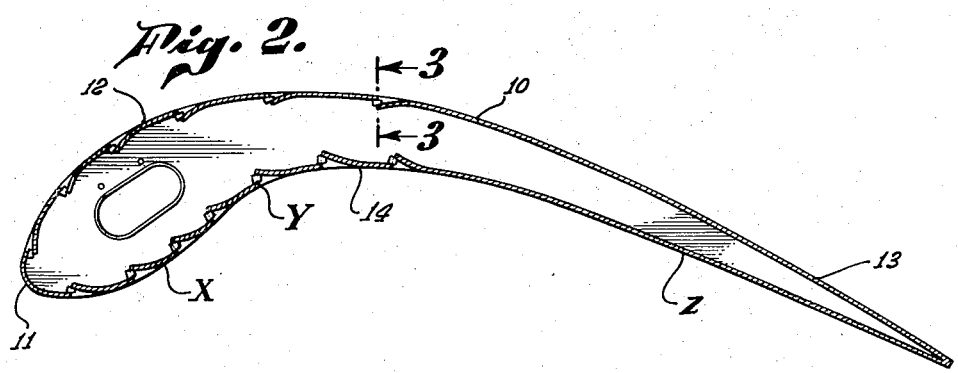
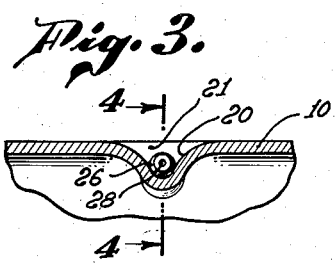
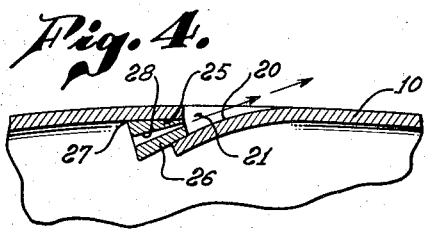
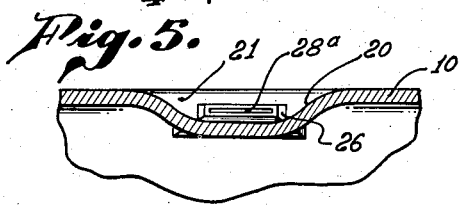

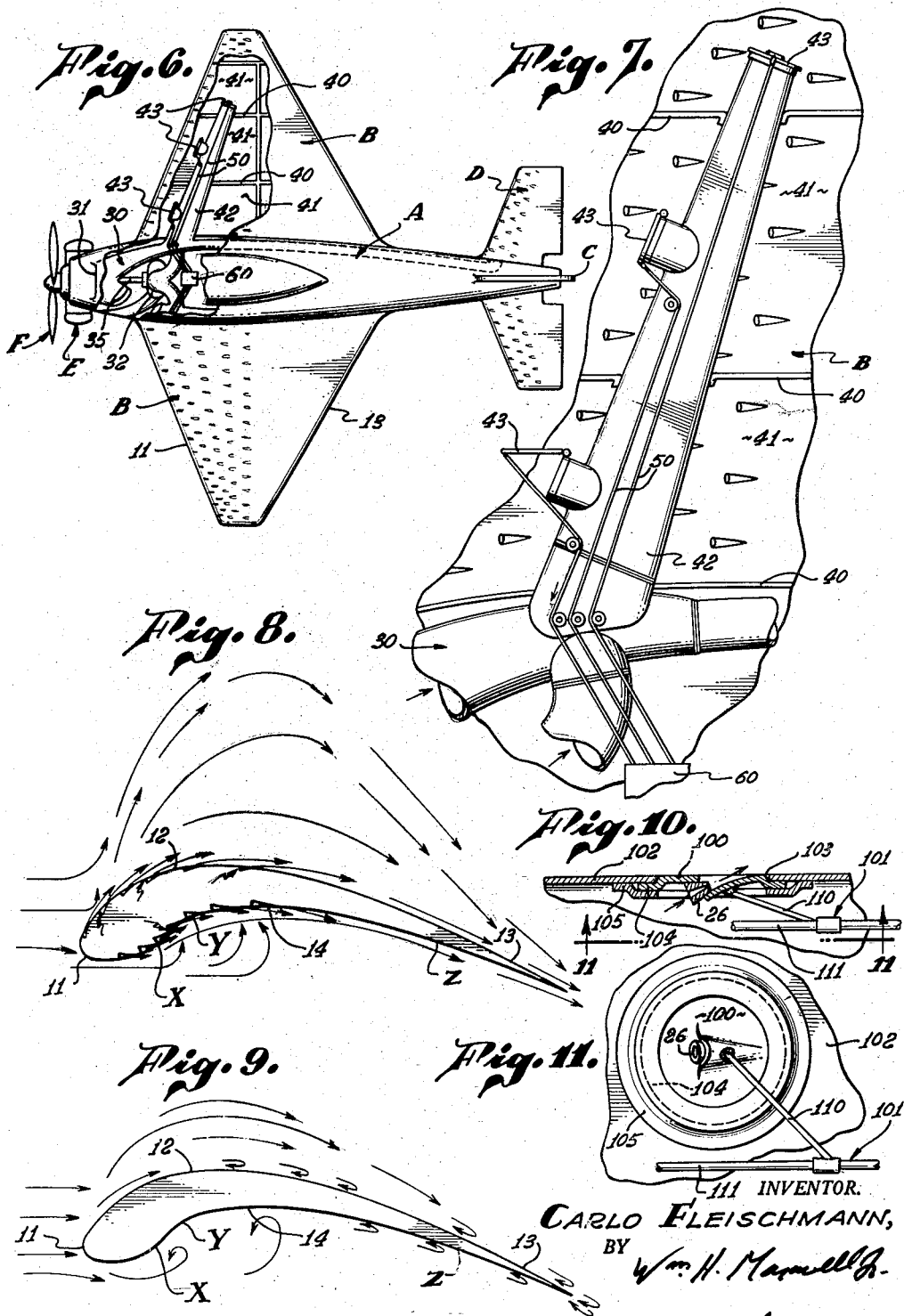

2,873,931

BOUNDARY LAYER CONTROL APPARATUS FOR IMPROVING THE ACTION OF AIRCRAFT

Carlo Fleischmann, Los Angeles, Calif.

Application August 24, 1953, Serial No. 375,954

9 Claims. (Cl. 244—42)

This invention is concerned with an apparatus for improving the action of aircraft and particularly aircraft of the heavier than air type, such as the conventional type of airplane, and it is a general object of the invention to provide an apparatus whereby the action, and particularly the lift, of such an aircraft is improved.

In the case of the ordinary or conventional heavier than aircraft employing one or more wings, or the like, there is, as the craft operates, a normal or natural air flow or boundary layer of air around each wing and this layer of air materially effects or influences the action or effectiveness of the wing.

It is a general object of this invention to provide a device by which the boundary layer of air at the wing of a heavier than air aircraft is modified or supplemented by additional air acting in and as a part of the boundary layer to the end that the effective action or lift of the wing is materially improved.

It is another object of this invention to provide a wing structure subject, when in use, to the presence of a boundary layer and which is such that it serves to deliver added or supplemental air to the boundary layer during flight or while air is moving relative to the wing to increase the effective action of the wing.

Another object of this invention is to provide a device whereby air supplied to the wing of a heavier than air aircraft as the craft operates and is so distributed into the boundary layer of air at the wing as to advantageously effect the general action of the wing.

It is a further object of this invention to provide a device of the general character mentioned in accordance with which air is supplied to the boundary layer of the wing at a pressure, so that there is during flight an effective addition of air to that body of air which forms what is recognized as the boundary layer covering the wing.

It is another object of this invention to provide a wing construction by which air supplied to supplement the boundary layer of air covering the wing is added or supplied to the boundary layer at that portion of the wing where the additional air is highly effective and desirable in its action supplementing the normal boundary layer of air.

It is another object of this invention to provide a construction by which an effective, practical, controlled distribution of air is gained whereby the boundary layer of air at the wing is variously or selectively added to in an advantageous manner.

The various objects and features of my invention will be fully understood from the following detailed description of typical preferred forms of apparatus and typical preferred manner of carrying out the method of my invention, throughout which description reference is made to the accompanying drawings, in which:

Fig. 1 is a perspective view of a typical or conventional type of airplane embodying the present invention. Fig. 2 is an enlarged detailed transverse sectional view of a wing of the craft shown in Fig. 1 and showing construction provided by the present invention. Fig. 3 is an enlarged detailed sectional view of a part of the wing, being a view taken substantially as indicated by line 3—3 on Fig. 2 and showing a construction that can be employed in effecting distribution of supplemental air at the wing. Fig. 4 is a sectional view of the structure shown in Fig. 3 and taken as indicated by line 4—4 on Fig. 3. Fig. 5 is a view similar to Fig. 3 showing a slightly different form of air outlet handling supplemental air that is delivered to the exterior of the wing. Fig. 6 is a plan view of the aircraft with certain portions broken away to illustrate details of construction. Fig. 7 is an enlarged detailed view of a portion of the air ducts and control valves appearing in Fig. 6. Fig. 8 is a diagrammatical view illustrating generally the flow of air that occurs relative to the wing. Fig. 9 is a view similar to Fig. 8 indicating generally the type of air flow that occurs in the event that there is no supplemental air supplied to the wing. Fig. 10 is a sectional view illustrating an adjustable nozzle construction, and Fig. 11 is a view taken substantially as indicated by line 11—11 on Fig. 10.

The present invention is applicable generally to heavier than air aircraft wherein wings, or the like, are employed, and in the following description the invention will be described as applied to the wing of an airplane whereas it is to be understood that the invention may, if desired, be carried out in connection with other elements of the craft as circumstances may require.

In the particular case illustrated, there is a conventional type of airplane having an elongate fuselage A, like wings B at opposite sides of the fuselage, projecting laterally therefrom, and a detailed structure at the rear end portion of the fuselage including a rudder C and stabilizer D. In the embodiment of the invention illustrated, the structure as provided by the present invention is shown applied in like manner to the two wings B, and therefore the following description of one wing is to be understood as applicable to both. Further, the invention is shown applied to the stabilizer D and when the term wing is employed, it is to be understood as including various elements, that is, elements such as the wings B or stabilizer D of a craft such as is shown in the drawings.

In the particular case illustrated, the craft is provided with a prime mover or engine, in the form of an internal combustion engine E, and the engine is shown located at the forward end portion of the fuselage A and as driving a conventional propeller F. It is to be understood, of course, that propulsion of the craft can be effectively gained in any suitable manner or by any suitable force generating means, and air under pressure for carrying out the present invention can be gained in various suitable manners, for instance, it may be derived from the means employed to propel the craft, and in carrying out the invention the manner of taking the desired air will, of course, depend upon the type of propulsion employed, details of construction entering into the craft, etc.

In the construction illustrated, the wing B, best shown in Figs. 2 to 4 of the drawings, is of suitable cross sectional configuration and involves a skin 10 of suitable sheet metal, or the like. The wing in the preferred form is characterized by a leading edge portion 11, a top side 12 that is generally convex in form and fairs into a trailing portion 13. The wing has a bottom side 14 proceeding rearwardly from the nose portion and generally concave in form and finally fairing into the trailing portion 13 as clearly shown in the drawings.

In the preferred wing form the leading portion 11 is convex in form, presenting a rounded nose entering the body of air in which the craft flies. The top side 12 proceeds up and rearwardly from the leading portion, rounds off at the top or uppermost part of the wing, and then continues rearwardly and possibly downwardly to fair into the substantially flat trailing portion 13. The bottom side 14 of the wing leads away or rearwardly from the leading portion and is initially slightly convex in form at X where it extends rearward and upwardly, is then concave in form at the Y, and then is substantially flat at the region Z where it fairs into the trailing portion 13. The top of the wing is curved to have substantial heighth above the leading portion 11, the lower side 14 is generally concave and the concavity of this portion of the wing is substantial so that there is, in effect, a rather deep cavity at the lower side or under portion of the wing as clearly shown in the drawings, and such as is characteristic of a bird's wing.

The present invention is in no way concerned with the manner in which the wing, as above described and as shown in the drawings, is constructed or fabricated. It is to be understood that, in practice, any suitable wing formation or construction can be utilized, and since most wing constructions provide a hollow or cellular wing, it is to be understood that the wing employed in carrying out the present invention is hollow except, of course, for braces, ribs or other structural elements that may be incidental to it or incidental to equipment located in the wing.

In accordance with the present invention air is introduced to the boundary layer of air occuring around the wing, and in accordance with the invention, this additional or supplemental air is supplied to the boundary layer of air from the interior of the wing. The invention in its preferred form contemplates introduction of the additional or supplemental air into the boundary layer of air at the leading portion of the wing and at the portions of the top 12 and bottom 14 of the wing that adjoins the leading portion. In a typical application of the invention and as shown in the drawings, the supplemental air is introduced to the boundary layer of air around the wing throughout the leading portion and throughout the portions 12 and 14 for a distance of about one-third to one-half the distance from the foremost edge of the wing to the rearmost edge thereof. It is to be understood, however, that in accordance with broader principles of the invention the additional or supplemental air can be introduced at a more limited portion of the wing or more extensively as circumstances may require. Further in carrying out the invention and as will be hereinafter described, the additional or supplemental air can be introduced at various regions of the wing longitudinally thereof as may be required.

In accordance with the construction provided by the invention the top 12 and bottom 14 of the wing, as well as the leading portion thereof where the additional or supplemental air is to be supplied, is provided at suitable points or locations with indentations 20 establishing suitable cavities 21 in the skin of the wing, and the indented portions establishing the cavities are provided with apertures or openings through which the additional or supplemental air is passed.

In the preferred construction, as where the skin of the wing is sheet metal, it is preferred to form each indentation so that it is concave or trough-like in transverse cross sectional configuration, or when considered in a direction longitudinally of the wing, and is of varying depth when considered transversely of the wing, being a maximum depth at the foremost or forward end and becoming gradually shallower as it proceeds rearwardly as clearly illustrated in Fig. 4 of the drawings. In the preferred construction as illustrated the opening 25 is located in the foremost part or end of the cavity and is provided with an insert or nozzle 26, which element is fitted or secured tightly in the opening 25 to completely fill it, and is suitably secured in place as by bonding 27, or the like. The nozzle 26 is provided with an air passage or jet opening 28 which, as shown, extends in a general direction toward the trailing edge of the wing. In practice, the opening 25 and corresponding nozzle 26 can vary in size and shape, for instance, as shown in Figs. 3 and 4, these parts can be round, whereas as shown in Fig. 5, they may be flattened. Further, it is to be recognized that the jet opening 26 may be, as shown in the drawings, a single jet opening. The jet opening as shown in Figs. 3 and 4 is round in cross section, whereas that shown in Fig. 5 and designated as $28^a$ is flattened or slot-like.

In carrying out the invention the indentations and corresponding cavities 21 may be suitably spaced and arranged in or throughout the wing portions where the air is to be supplied, and in the case illustrated they are in lines lengthwise of the wing with the indentations of adjacent lines staggered so that there is, in effect, a substantially even or general distribution of air at the exterior of the wing. It is to be understood, of course, that, in practice, the spacing arrangement and number of cavities can be varied as circumstances require and the cavities may vary in proximity or arrangement at various parts of the wing as circumstances may require.

In accordance with the present invention air is supplied to the wing as by means of a main supply duct 30, and from the interior of the wing the air issues through the nozzles 26 to be directed or jetted rearwardly into the boundary layer of air at the exterior of the wing to supplement that layer of air and energize the same. In the particular case illustrated, the air supply duct 30 receives air from different and separate sources, either of which or both of which may be used as circumstances require. A forwardly opening scoop 31 is shown at the forward portion of the fuselage A and at the exterior thereof. The scoop is such that as the aircraft advances air is caught by the scoop and directed to the duct 30. A mechanical air compressor 32 is shown driven from the prime mover or engine E of the craft as by a shaft 35. The compressor delivers air under suitable pressure to the duct 30. In the preferred form of the invention means is provided whereby the additional or supplemental air may be controlled so that there is selective discharge of air into the boundary layer at the exterior of the wing. It is recognized that this control or selection can be gained in various ways, and in the case illustrated it is gained by providing partitions 40 in the wing transversely thereof, dividing the interior of the wing into chambers 41. An air distributing duct 42 extends from the supplying duct 30 to the several chambers and where desired, controls, for instance, valves 43 are provided where the distributing duct discharges into the chamber. In the particular case illustrated the distributing duct 42 extends to the outermost chamber 41 in the wing and the flow of air into each of the other chambers is under control of a valve 43.

It is to be understood that, in practice, any suitable form or type of control of valve can be used in carrying out the invention and any suitable control system can be provided for operating or controlling the valves. In the case illustrated the valves are shown mounted so that pressure of air tending to issue into chambers 41, tend to open the valves and the valves have control lines 50 connected to them and extending over suitable pulleys, or the like, to a suitably located control or instrument assembly 60. With the construction, as tension is applied to lines 50, valves are closed or held closed, whereas when a valve is desired to be open the line in connection therewith is relaxed or released so that the air pressure opens the valve.

The general construction just described is particularly practical and advantageous in the case of a wing of the type commonly termed "swept" wing. In the case of the swept wing there is normally a relatively thin boundary layer of air at the end portion of the wing that adjoins the fuselage, and the boundary layer increase in thickness toward the outermost or tip of the wing. It will be immediately apparent that with the method and construction provided by the invention the boundary layer of air on a wing, such as a swept wing, can be energized where desired, as for instance, the portion adjacent or approaching the fuselage and through suitable regulation or control a substantially uniform boundary layer can be established and maintained throughout the length of the wing.

In accordance with the present invention, for instance, in a plane embodying the features hereinabove set forth, as the aircraft operates or advances the usual or normal boundary layer of air tends to prevail at the exterior of each wing, and air under pressure is available from the supply duct 30 either by reason of it having been scooped into the duct or by reason of the action of the compressor 32, or the combined action of both of these means. The valves or controls 43 are operated as desired and when any one of the control valves is open, there is a flow of supplemental air from the interior of the wing to the boundary layer of air at the exterior of the wing, thus building up the energy in the boundary layer. Under normal conditions several or in fact all of the controls may be opened so that there is a general, possibly a uniform, discharge of supplemental air into the boundary layer throughout the entire portion of the wing constructed as provided by the invention with the result that the aerodynamic effect of the wing is changed to gain an increased lift. In other words, the effective air foil of the wing is altered.

As the energy of the boundary layer of air at the exterior of the wing is built up or supplemented by the additional air within the wing the effective action or lift of the wing is increased, this being particularly true insofar as the top of the wing is concerned. In the case of an ordinary or a normal wing there is the boundary layer of air at the lower side or bottom of the wing that forms a cushion of air against which the upwardly acting air exerts pressure to effect lift. With the wing formation as shown and with the supplemental air added to the boundary layer, there is a flow or turbulence of air outward of the boundary layer at the lower side of the wing exerting a thrust in a forward direction as will be apparent from a consideration of Fig. 8 of the drawings.

The nozzles 26 in the wing section shown in Fig. 8 may be operable to provide various desired results. For example, when the nozzles in the top portion of the wing are open, the air flow is kept even across the upper surface of the wing, even at high angles of attack. The nozzles in the lower surface of the wing will also keep the air flow even along said surface to prevent creating a vacuum condition which would tend to increase the effective drag.

It will also be apparent that the nozzles in the upper and lower surfaces of the wing may be operated simultaneously, in which event the nozzles in the upper surface will energize the boundary layer at the top of the wing and the nozzles at the lower surface will energize the boundary layer at the upper surface, with the result that the overall lift will be increased.

It will also be apparent that the upper or lower nozzles, or both, in the wing section on one side of the fuselage may be operated to facilitate banking and turning of the airplane in flight.

In Figs. 10 and 11 of the drawings there is illustrated a construction that can be employed when it is desired to selectively direct the air introduced at the exterior of the wing. With the construction above described and as illustrated in the preceding figures of the drawings, the air is directed uniformly and constantly in one direction, that is, rearwardly or toward the trailing edge portion of the wing. In the construction shown in Figs. 10 and 11, nozzles 26, such as those above described, are carried by adjustable sections 100 of the wing and a means 101 is provided for operating the adjustable wing sections to direct the nozzle in any direction desired. In the particular case illustrated, the main or fixed section 102 of the wing or skin of the wing, has a round opening 103 formed in it and the adjustable wing section 100 is mounted in the opening 103 to be flush with the fixed section. A suitable flange 104 projects from the adjustable section 100 and overlies the inner side of the fixed section 102 where it is held or retained by brackets 105. The nozzle 26 and parts related thereto may be the same as the construction shown in Figs. 3, 4 and 5.

The means 101 provided to effect adjustment of the section 100 may be any suitable means effective to rotate the section 100 to a desired position and preferably serves to maintain the section in adjusted position. In the case illustrated, the means 101 includes, an arm 110 projecting from section 100, and an operating member, such as a line or a rod 111, connects to the arm 110 and extends to a point in the aircraft from which it can be operated as desired.

It is contemplated that one or more of the nozzles 26 be carried by adjustable sections 100 and it is contemplated that the operating member 111 of means 101 may connect one or more of the sections 100 as circumstances may require. For example, through the means 101 sections 100 can be connected in groups so that certain groups can be adjusted in one manner while others can be adjusted differently. It is also contemplated that certain sections of the construction, for instance, the top side of the wing may, in practice, be wholly without adjustable sections 100 whereas part or all of the nozzles at another section may be mounted through adjustable sections 100, for instance, those at the lower side of the wing may be so mounted.

With the adjustable construction just described the nozzles so mounted can be adjusted or varied from time to time or selectively to direct air at the exterior of the wing into any desired direction as, for instance, rearwardly as in the case of the fixed nozzles illustrated, or in the opposite direction or forwardly or, if desired, in any desired intermediate direction.

The adjustable nozzles 26 shown in Figs. 10 and 11 greatly increase the versatility of the airplane as a whole. These nozzles may be adjusted to provide all of the advantages of the fixed nozzles described above in connection with Fig. 8 and at the same time afford many additional advantages. For example, the nozzles in the wing section on one side of the fuselage may be extended in a forward direction and the nozzles in the other wing section may be extended in an aft direction, and in this way greatly facilitate banking of the plane in making a turn. These nozzles may also be utilized to advantage in overcoming the objectionable effects of a side wind, namely, keeping the air flow from being washed off the wing surface. Thus, the nozzles may be directed to any angle necessary, into the wind, to keep the air flow going substantially straight across the wing from fore to aft. This will hold the boundary layer in the right direction and preserve the lifting effect of the boundary layer.

In addition, only the nozzles in the top surface of the wing may be adjusted to a forward direction in which event they will aid in nosing the plane down rapidly without requiring the operation of the conventional elevators. The action of the nozzles at such time will disturb the effective lift and the plane will descend faster.

If only the nozzles on the lower surface of the wing are directed forwardly, they will divert air over the top of the wing and in this way increase the effective lift. The nozzles in both the upper and lower surfaces of the wing may be simultaneously directed forwardly to produce a braking effect to reduce the speed of the airplane in flight.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. An aircraft wing having top and bottom skins with a fixed section and movable sections, each movable section having an opening through it adapted to pass air from the interior of the wing into air at the exterior of the wing, the movable sections being mounted to rotate about axes substantially normal to the plane of the fixed section where the movable sections occur, and operating means engaged with the movable sections and adapted to operate them relative to the fixed section.

2. An aircraft wing having top and bottom skins with a fixed section and movable sections, each movable section having an opening through it adapted to pass air from the interior of the wing into air at the exterior of the wing, and operating means engaged with the movable sections and adapted to operate them relative to the fixed section.

3. An aircraft having a skin with a fixed section and a plurality of spaced movable sections each with an opening through it adapted to pass air from the interior of the wing to the exterior thereof, and means connecting a plurality of the movable sections in a group and adapted to operate them relative to the fixed section.

4. An aircraft wing having skins top and bottom with a plurality of spaced depressions therein establishing recesses in the wing at the exterior thereof, the recesses having a bottom that is concave in cross-section spanwise of the wing and is inclined rearwardly so that the recesses are of a maximum depth at their forward portion, there being rearwardly faced openings in the skin of the wing at said recesses, the openings being disposed at the deepest portion of the recesses and inclined relative to the skin and adapted to pass air from within the wing to the recesses to flow rearwardly therefrom into the boundary layers of air at the exterior of the wing, said recesses being arranged in lines staggered with respect to one another extending chordwise over about one-third to one-half the distance from the foremost edge of the wing.

5. An aircraft wing having skins top and bottom with a plurality of spaced depressions therein establishing recesses in the wing at the exterior thereof, the recesses having a bottom that is concave in cross-section spanwise of the wing and is inclined rearwardly so that the recesses are of a maximum depth at their forward portion there being rearwardly faced openings at the forward portions of the recesses in the skin of the wing, the openings being disposed at the deepest portion of the recesses and inclined relative to the skin and adapted to pass air from within the wing to the recesses to flow rearwardly therefrom into the boundary layers of air at the exterior of the wing, said recesses being arranged in lines staggered with respect to one another.

6. A hollow aircraft wing having top and bottom skins, partitions dividing the interior of the wing into separate chambers, and means adapted to selectively supply air under pressure to the chambers, the skins having spaced recesses with rearwardly faced openings extending through the skins, the recesses having a bottom that is concave in cross-section spanwise of the wing and is inclined rearwardly so that the recesses are of a maximum depth at their forward portion, the openings being disposed at the deepest portion of the recesses and being inclined relative to the skins and adapted to pass air from the chambers to the exterior of the wing adjacent the skins and into the boundary layers of air at the exterior thereof, said openings being arranged in lines staggered with respect to one another.

7. An aircraft wing having top and bottom skins with a fixed section and movable sections, each movable section having an opening through it adapted to pass air from the interior of the wing into air at the exterior of the wing, the movable sections being mounted to rotate about axes substantially normal to the plane of the fixed section where the movable sections occurs, said openings being arranged in lines staggered with respect to one another and operating means engaged with the movable sections and adapted to operate them relative to the fixed section.

8. An aircraft wing having top and bottom skins with a fixed section and movable sections, each movable section having an opening through it adapted to pass air from the interior of the wing into air at the exterior of the wing, and operating means engaged with the movable sections and adapted to operate them relative to the fixed section, said openings being arranged in lines staggered with respect to one another.

9. An aircraft having a skin with a fixed section and a plurality of spaced movable sections each with an opening through it adapted to pass air from the interior of the wing to the exterior thereof, and means connecting a plurality of the movable sections in a group and adapted to operate them relative to the fixed section, said openings being arranged in lines staggered with respect to one another.

References Cited in the file of this patent

UNITED STATES PATENTS

| | | |
|---|---|---|
| 1,580,577 | Baumann | Apr. 13, 1926 |
| 1,854,043 | Korner | Apr. 12, 1932 |
| 1,903,818 | Jutting | Apr. 18, 1933 |
| 2,376,834 | Thompson | May 22, 1945 |
| 2,399,839 | Vorse | May 7, 1946 |
| 2,437,732 | Ferrel | Mar. 16, 1948 |

FOREIGN PATENTS

| | | |
|---|---|---|
| 702,926 | Germany | Feb. 24, 1941 |